United States Patent Office 3,097,619
Patented July 16, 1963

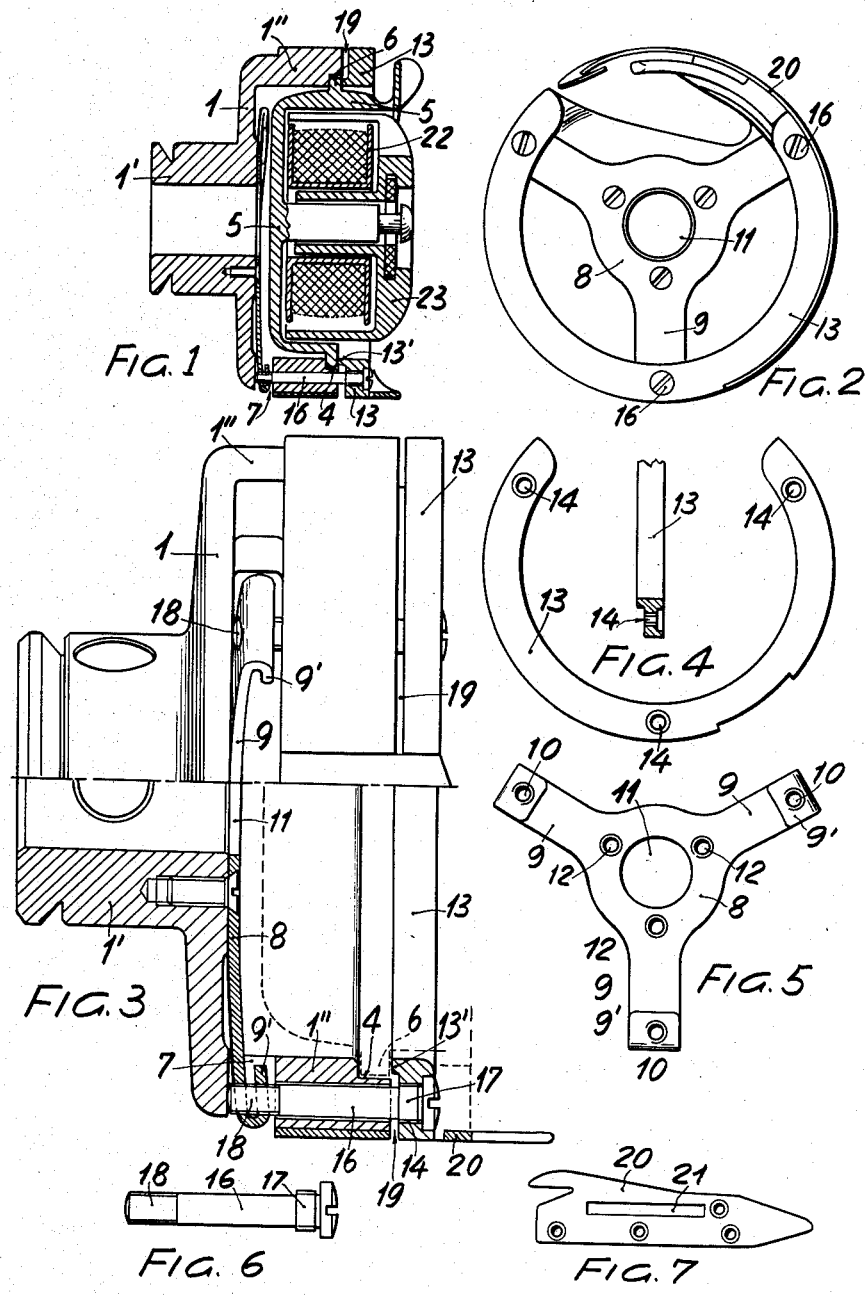

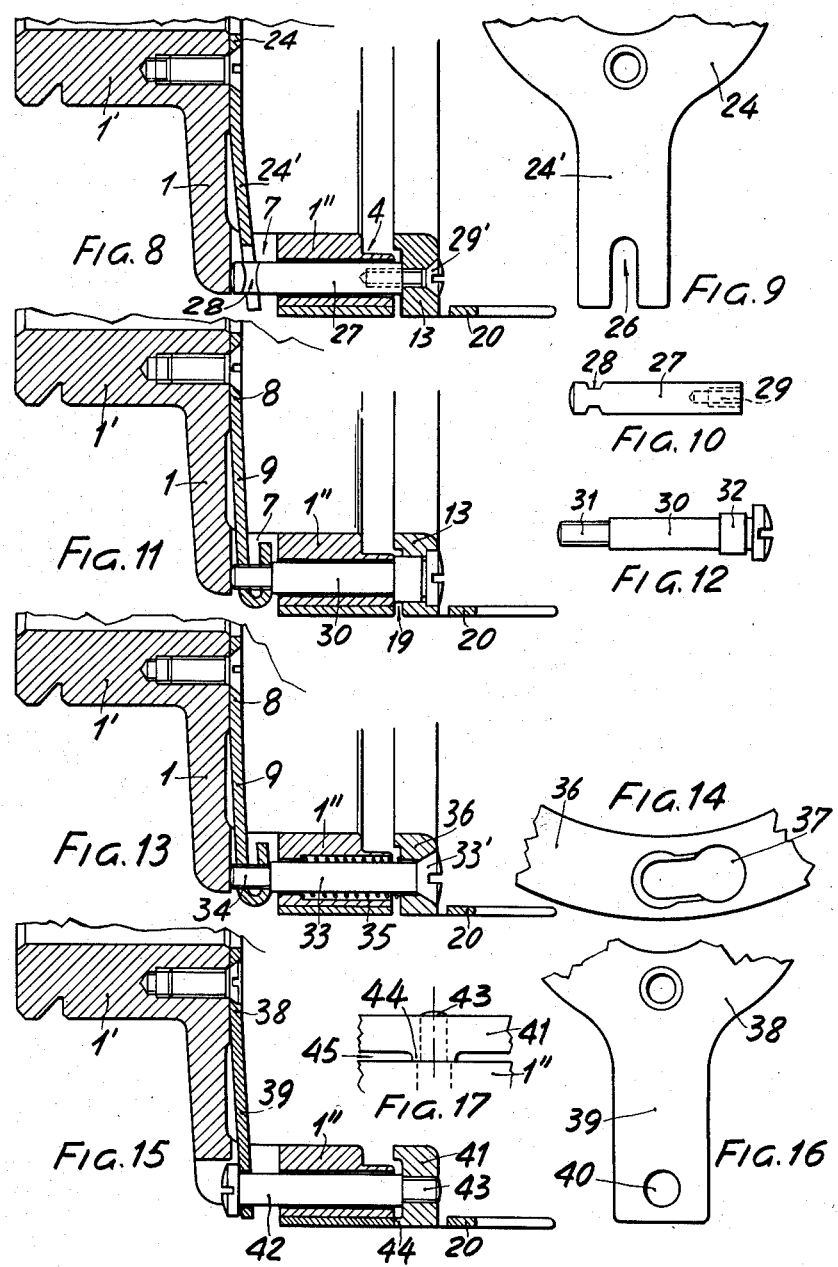

3,097,619
ROTARY HOOK DEVICES FOR SEWING MACHINES
Maurizio Cerliani, Frazione Mascherpa, Pavia, Italy
Filed Jan. 9, 1961, Ser. No. 81,551
Claims priority, application Italy July 13, 1960
7 Claims. (Cl. 112—228)

This invention relates to improvements in rotary hook devices of closed seat type for sewing machines, and more particularly it has for its object to avoid the considerable drawback of the rotary hooks known to-day, that is to say the easy locking of these parts, when the upper machine thread is caught between the fixed and the movable parts of the assembly forming the hook.

In the hook devices commonly used the hook body has a circularly shaped slot seat, of polygonal section.

Within this seat is driven the relative part of base, with circular edge having a corresponding prismatic section.

In order to fit the base into the seat, it is necessary for the seat to be partially opened on a side.

This opened part, after inserting the base, is re-closed by a separate segment fixed by screws to hook body.

During operation the hook body turns round the base seat which remains fixed, and for reasons of avoiding noise the play between the above mentioned contacting parts, one of which rotating, is very small.

Consequently, if dust or thread residues enter the hook seat through the clearance which must be provided, the parts jam; this often happens at the second or following stitch, if, when beginning stitching, the top and bottom threads are not held taut. In fact, the hook point might pick up the upper thread, if, not being taut, it happens to be on trajectory of hook point.

When this happens, it is necessary to disassemble the hook in order to remove the thread which caused jamming of the two seats. Such operation is very complicated, takes a lot of time and can cause the damage of the two seats.

To avoid these difficulties only partially successful solutions have been proposed.

For example, according to one of these solutions the hook seat has a wholly open side, which after inserting the base is re-closed by means of a ring-shaped segment which fits outside a cylindrical surface.

The cylindrical connecting strip is very thin and is joined by means of a hook engaging suitable slots in blade members which allow a springing of the segment so as to allow removing or expulsion of thread eventually jamming the seat; but the elastic excursion of this ring is not satisfactory and the residue of thread and dust remain within the inner part of ring itself. Furthermore, periodic disassembling must be undertaken which is a very difficult operation.

This invention on the contrary relates to a rotary hook which avoids jamming and need not be dismounted for cleaning because residues of thread and dust are removed from the hook by centrifgual force during normal functioning. The hook body has a seat open on one side and after inserting the base member this side is closed by a ring acting axially only upon the seat of the base and leaving a radial slot between the ring and hook body.

This ring is kept in position by three springing arms which, in normal conditions, axially limit the seat constantly, and which, when thread enters the seat, allows it to expand axially and in one direction in order to allow expulsion of thread.

An example of construction with some modifications of this invention is represented in the accompanying drawings wherein:

FIG. 1 is a cross section of a complete hook device,
FIG. 2 is a front view of the hook cup body,
FIG. 3 is a partially sectioned side view of the hook unit with one form of springing device and on a larger scale than FIG. 1,
FIG. 4 is a front view and partial section of the C-ring,
FIG. 5 is a front view of the spring for FIG. 4,
FIG. 6 shows a clamping screw with two different threads,
FIG. 7 shows the thread guide blade with longitudinal slot,
FIG. 8 is a variation in the clamping means of FIG. 4,
FIG. 9 is partial front view of FIG. 8,
FIG. 10 shows in detail clamping screw elements according to the FIGS. 8 and 9 variations,
FIG. 11 shows partially and in section another variation of the clamping system,
FIG. 12 shows in detail a clamping screw used in the FIG. 11 construction,
FIG. 13 is a variation of the clamping system,
FIG. 14 shows a detail of keyhole fastening of the FIG. 13 clamping screw,
FIG. 15 shows a fourth variation of the clamping system,
FIG. 16 is a front view of a spring part for sector, inherent to the FIG. 15 variation,
FIG. 17 shows a detail according to FIG. 15.

The device shown comprises a hook 1 of substantially the same dimensions as the known rotary hook devices with a hub 1' and a hollow cup-shaped part 1''.

The upper part of the cup comprises a circular peripheral recess 4 adapted to receive a projecting circular rim 6 of a bobbin case member 5.

The lower part of the cup 1'' includes three slots 7 traversed by three arms 9 of a dish-shaped spring disc 8, fitted at the base of the cup 1''. In the form of construction illustrated in FIGS. 1 to 7, the ends of each arm are bent to U-form at 9' and drilled with a hole 10 conveniently tapped.

The spring 8 has a centre hole 11 and three screw holes 12 for fixing the spring at the base of hook body 1.

The rim 6 of casing 5 is engaged by a C-ring 13 (FIG. 4), the thickness and section of ring 13, and the position of fixing holes 14 therein are clearly indicated in the small radial section shown on the centre line in FIG. 4.

The clamping of the C-ring 13 on the body 1 is obtained by means of screws 16, illustrated in FIG. 6, having two portions of different diameter, that is a screw threaded portion 17 near the head, and screw threaded end portion 18 having different threads, the former to screw into hole 14 of C-ring 13, and the latter in the tapped holes 10 of the overturned ends 9' of arms 9 of spring 8.

The casing 5 is thus spring mounted within cup portion 1'' of the hook 1, which secures great advantages as will be realised later.

The different threads of threaded portions 17 and 18 of screws 16, and the L-shape of the C-ring 13 allow very slight play between annular recess 4 and the rim portion while allowing, in case of need, some degree of spring controlled movement due to the clamping of C-ring 13 on the arms 9 of spring 8, and to allow an easy release from said components of thread residues which might remain held between the rotating and the fixed parts of the device. Furthermore, the play about the projecting rim 13' of the C-ring 13, leaves outlets 19 between C-ring 13 and the cup 1'' of the hook, through which, owing to centrifugal force, the residues of thread and dust which may gather outside the casing are easily removed, and in this way the bearing surfaces of the casing and hook are always clean.

A thread guide blade 20 is fitted to the hook periphery and includes a slot 21 for the discharge of all residues of thread and dust gathered between the casing and hook and corresponding to the slots 19 left between the C-ring 13 and cup 1".

As above mentioned, screwing in the screws 16 after passing them through holes formed in the cup portion 1" of hook 1, causes them to engage the threaded holes 14 of C-ring 13, thus holding down the latter and at the same time they engage also the tapped holes 10 of arms 9 of spring 8, and owing to the longer thread portion 18 of such screws, they cause the bending of above mentioned arms 9 of the spring.

By this means, after screwing in the screws 14, the three arms 9 as well as the tips of the three screws press against the bottom plane of slots 7, and the C-ring 13 remains in the exact wanted position.

Of course, the position of the C-ring is a function of the length of the screws 16, and, therefore, the edges 13' of the C-ring 13 will be able to close the seating 4 where rim 6 is in place, with the axial play required.

Besides, said C-ring 13 can move elastically in axial and one-directional sense if it is placed under a thrust sufficient to overcome the tension of three arms of spring 8.

For these reasons, if, while sewing, the thread should enter between seat 4 and rim 6, these parts will not jam because the C-ring 13 will lift elastically and expand the transverse dimensions of the seat 4 permitting the disengagement of said thread.

As the drawing shows, the thread guide blade 20 has a special shape in this case; it presents, as already said, a slot 21 which also limits the maximum elastic excursion in the axial sense of the C-ring, and also allows, as already said, the ejection, by centrifugal action, of residues such as thread and dust, gathered beneath it.

Of course, the above described hook, is completed as usual by a bobbin 22 and a bobbin case 23, which follow normal practice, and therefore are not further described.

FIGS. 8, 9 and 10 illustrate a variation of the clamping of the C-ring 13 to the hook body. The C-ring is generally constructed as described, but the spring 8 is replaced by a spring 24 having three arms 24', the ends of which are not bent to U-shape but present an open slot 26 such ends pass through slots 7 of the cup 1" and embrace recesses 28 in push rods 27 (FIG. 10) each having a tapped hole 29, a set-screw 29' passing through holes provided in the C-ring 13. In this way a spring connection is provided between the C-ring 13 and body 1, and as in the preceding case, the play between the rim 6 and the respective seating 4 is regulated according to requirements and elastic expansion can occur as in the preceding case, whenever it is necessary.

FIGS. 11 and 12 show another variation of this mounting of the C-ring 13 on hook body 1. In this case the blade spring 8 has arms 9 with U-shaped ends and a tapped hole; the clamping screws in this case are illustrated in FIG. 12 where such screws 30 have only one threaded end portion 31 to screw in the holes of spring arms 9, while having a portion of greater diameter extending towards the head, and in particular the upper portion 32 has a lower shoulder adapted to rest upon external edge of hook cup portion 3, so as to keep the slot 19 between the C-ring 13 and the upper surface of cup 1".

In the variation illustrated in FIGS. 13 and 14 the spring 8 with U-shaped ends 9 is the same as in the cases of FIGS. 1 and 11; the clamping screws 33 present only the terminal portion of smaller diameter 34, threaded for screwing in the tapped holes of arms 9, and holes are provided in the cup 1" for the passage of the clamping screws for the C-ring 13. These holes have a portion of greater diameter in order to be able to house around each screw 33, a helical spring 35, the outer end of which bears against the under wall of C-ring 36.

This latter differs from the C-ring 13 of the preceding constructions because it presents instead of simple holes like those indicated with FIG. 14 in the first form of realisation, keyhole slots 37, part of which has a diameter slightly greater than the head 33' of screws 33, because said C-ring is mounted after the screw 33 has been screwed into the ends of respective spring arms 9; this is possible because the connection between such C-ring 36 and such screw is obtained by the keyhole slots 37 as illustrated in FIG. 14.

FIGS. 15, 16 and 17 show another variation in which the spring 38 has arms 39 with flat ends, each of which has a simple through hole 40. The upper C-ring 41 corresponding to rings 13 and 36 of the preceding arrangements, slightly differs from these because it has a channelled section, as can be clearly seen in FIGS. 15 and 17, and the three holes therein are tapped.

The screws 42 holding the C-ring 41 are inserted from below; they pass through holes 40 of spring 38 and are screwed into the tapped holes of the C-ring 41; the required play is in this case secured by the peripheral projections 44 of the C-ring 41 which bear on the terminal wall of the cup 1"; such projections 44 (FIG. 17) located only near the three clamping zones, are thus disposed adjacent the screws and leave free slots 45 through which residues of thread and dust are eliminated by centrifugal force, as in the preceding cases.

Of course, the variations illustrated are not intended to limit the invention because other systems and variations can be easily designed by experts in this particular technical field, but all such systems and variations are included in this invention as defined by the following claims.

What I claim is:

1. A rotary hook unit of the closed seat type for sewing machines comprising
   a hook cup having a seat for a casing containing a bobbin,
   said seat being formed by an annular slot in the interior rim portion of said hook cup,
   a C-ring for mounting the bobbin casing in said slot of the hook cup,
   resilient means for holding the C-ring in position for mounting said bobbin casing while permitting limited axial movement of the C-ring with respect to the hook cup,
   said resilient means comprising a central body portion and a plurality of radial arms,
   means for mounting said resilient means in the central part of the bottom of said hook cup,
   said hook cup containing a plurality of radial slots adjacent the bottom thereof adapted to accommodate the radial arms of said resilient means,
   said hook cup also containing bores extending from said radial slots to the rim of said cup, and
   means for connecting the C-ring to the arms of said resilient means through said bores.

2. The device as claimed in claim 1 wherein each of the means for connecting the C-ring to the arms of said resilient means comprises screw threads.

3. The device as claimed in claim 2 wherein at least one of the arms of said resilient means has a U-shaped end which extends into its particular slot,
   the U-shaped end being tapped to receive the screw threads of the means for connecting the C-ring thereto.

4. The device as claimed in claim 1 wherein said C-ring comprises an interior, inwardly-projecting rim adapted to contact the bobbin casing whereby the outer portion of said rim provides for a gap between the C-ring and the rim of the cup to permit residues of threads and dust to escape from the cup.

5. The device as claimed in claim 1 wherein at least one of the arms of said resilient means is provided with a slot,
   said means for connecting the C-ring to said resilient means comprising rod means provided with a reduced portion at the inner end to engage the slot of said arm.

6. The device as claimed in claim 1 wherein the end of at least one of the arms of said resilient means comprises a tapped hole,
> said means for connecting the C-ring to the arm of the resilient-means comprising a rod-like element with a head at one end and screw-threads at the other end adapted to fit the tapped hole of said arm end,
> the remainder of said element adapted to pass through the bore of said cup,
> and helical spring means within the bore of said cup urging the C-ring against the head of said rod-like element.

7. The device as claimed in claim 1 wherein the end of at least one of said arms of the resilient means comprises a hole,
> said means for connecting the C-ring to the resilient means comprising a rod-like element having a head at one end, screw threads at the opposite end and an intermediate cylindrical portion,
> said C-ring comprising tapped openings,
> said means for connecting the C-ring to the resilient means positioned with the head at the arm of the resilient means and the threaded end in the threaded opening of the C-ring.

References Cited in the file of this patent

UNITED STATES PATENTS 2,802,438  Colegrove _____ Aug. 13, 1957

FOREIGN PATENTS 248,191  Switzerland _____ Jan. 16, 1948
625,635  Great Britain _____ June 30, 1949